United States Patent [19]
Eilers et al.

[11] Patent Number: 5,669,654
[45] Date of Patent: Sep. 23, 1997

[54] EXTENDABLE REAR GATE FOR VEHICLE CARGO BED

[75] Inventors: Gregory L. Eilers, Royal Oak; Gary E. Fulkerson, Auburn Hills; Sven A. Christopherson, Durand, all of Mich.

[73] Assignee: MSX International Engineering Services, Inc., Auburn Hills, Mich.

[21] Appl. No.: 587,319

[22] Filed: Jan. 16, 1996

[51] Int. Cl.$^6$ ................................................ B62D 33/08
[52] U.S. Cl. ................................................ 296/26; 296/57.1
[58] Field of Search ............................ 296/26, 183, 57.1

[56] References Cited

U.S. PATENT DOCUMENTS

| | | | |
|---|---|---|---|
| 372,775 | 11/1887 | Stumpf | 296/26 |
| 1,309,251 | 7/1919 | Lakin | 296/26 |
| 2,284,419 | 5/1942 | Grieg . | |
| 2,490,014 | 12/1949 | Brand | 296/26 |
| 2,729,499 | 1/1956 | Eggum . | |
| 2,784,027 | 3/1957 | Temp . | |
| 2,852,303 | 9/1958 | Hopson | 296/26 |
| 2,872,239 | 2/1959 | Bowness et al. . | |
| 3,004,790 | 10/1961 | Mayer | 296/26 |
| 3,768,673 | 10/1973 | Nydam et al. . | |
| 3,888,539 | 6/1975 | Neissner . | |
| 4,050,595 | 9/1977 | Bussard . | |
| 4,475,760 | 10/1984 | Morgan . | |
| 4,685,857 | 8/1987 | Goeser et al. . | |
| 4,951,991 | 8/1990 | Haigler . | |
| 4,993,088 | 2/1991 | Chudik . | |
| 5,064,335 | 11/1991 | Bergeron et al. . | |
| 5,149,164 | 9/1992 | Wilson | 296/57.1 |
| 5,456,511 | 10/1995 | Webber | 296/26 |

FOREIGN PATENT DOCUMENTS

| | | | |
|---|---|---|---|
| 1194487 | 11/1959 | France | 296/26 |
| 663586 | 12/1987 | Switzerland | 296/26 |

OTHER PUBLICATIONS

Wade Hoyt, "Freewheeling," Popular Mechanics, p. 36. May 1986.

Primary Examiner—Gary C. Hoge
Attorney, Agent, or Firm—Edgar A. Zarins; Malcolm L. Sutherland

[57] ABSTRACT

A selectively extendable tailgate section for a cargo bed of a pick-up truck. The tailgate section may be telescopically extended from the main body of the cargo bed to expand the cargo area as necessary. The telescoping tailgate section carries the flip-down gate and the tail lights of the vehicle keeping these features in tact regardless of the expanded position of the tailgate section. The telescoping tailgate section includes side walls and a bottom which are telescopically received within the fixed sides and bottom of the cargo bed. Rails support the expanded bed and are supported by a plurality of rollers for easy movement of the tailgate section. Additional structure support may be added to the tailgate section for improved structural capacity.

5 Claims, 3 Drawing Sheets

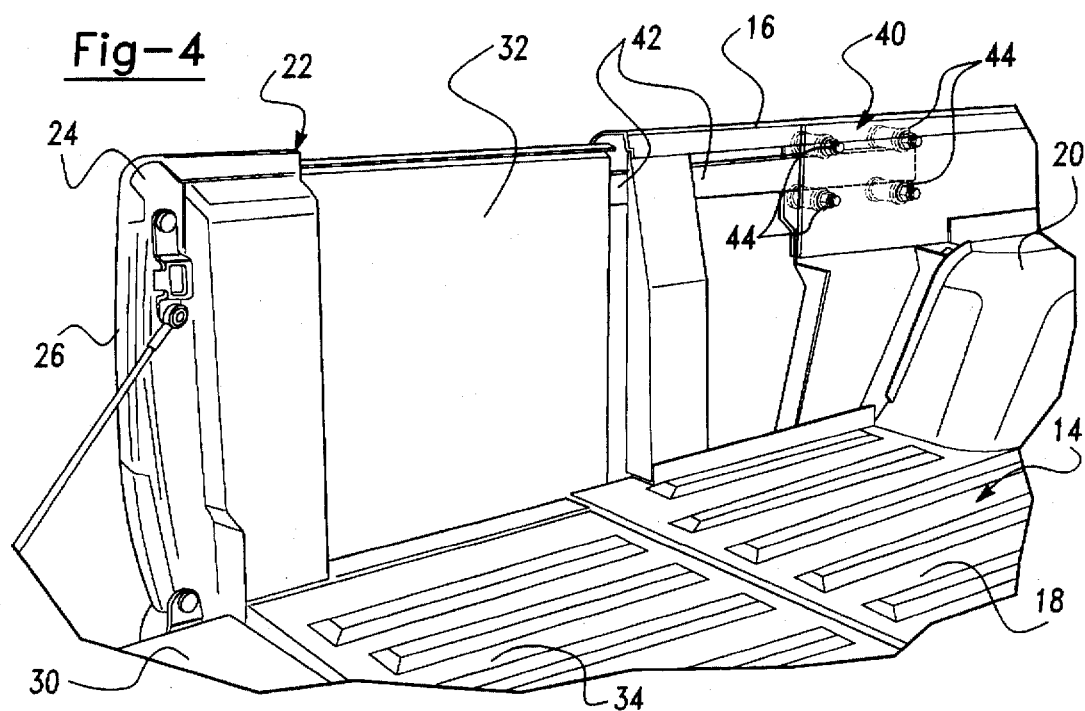
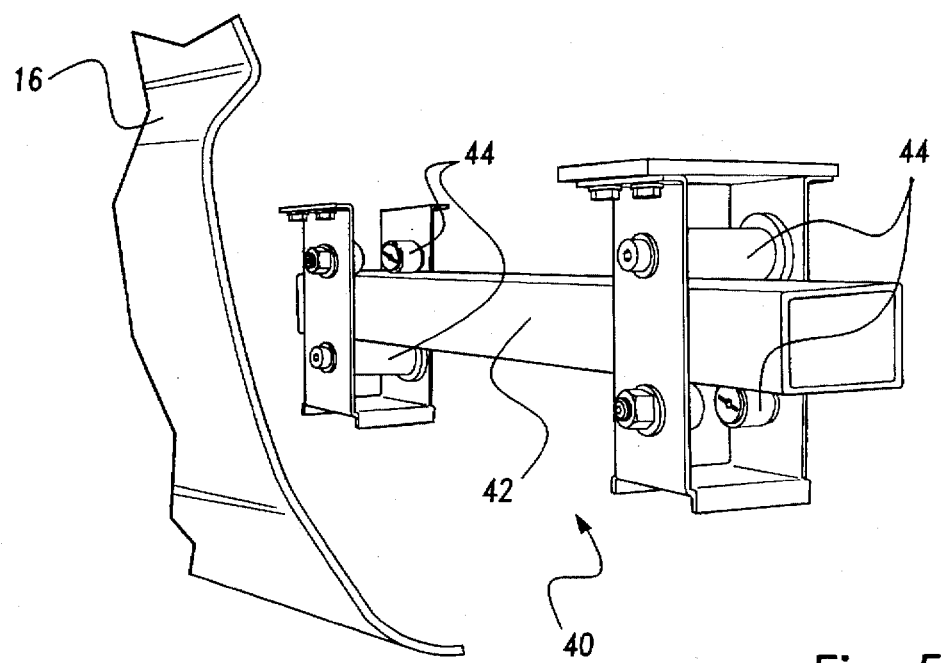

EXTENDABLE REAR GATE FOR VEHICLE CARGO BED

BACKGROUND OF THE INVENTION

1. Field of the Invention

This invention relates to the rear cargo bed of a pick-up truck and, in particular, to a selectively extendable tailgate section of the bed to expand the cargo capacity of the vehicle.

2. Description of the Prior Art

Utility vehicles have become increasingly popular for transporting passengers and cargo loads. Vehicle owners are demanding sporty vehicles which not only comfortably contain passengers but also provide increased cargo handling capacity. Manufacturers must balance these demands with performance requirements expected by the vehicle owner and mandated by regulation. As the size and capacity of the vehicle are increased, performance is typically compromised. Accordingly, vehicle manufacturers have developed means for increasing cargo capacity while maintaining the styling and performance qualities so popular with vehicle owners.

Manufacturers have attempted to increase cargo capacity in utility vehicles by incorporating sliding platforms or racks. The platforms may be mounted within the truck bed and include a table with rollers to facilitate selective extension of the platform. Although providing improved access to the bed and possible extension of the bed floor, because the sliding platform mounts within the bed the depth of the cargo area is reduced. Similarly, extension racks have been employed to support long loads on a temporary basis. The typical rack is secured to the bumper or understructure of the vehicle. In addition to being of limited usefulness, such racks are unsightly and cumbersome. None of the prior known extensions of the cargo area provide a mechanism for utilizing the structure of the vehicle thereby blending with the styling of the vehicle.

SUMMARY OF THE PRESENT INVENTION

The present invention overcomes the disadvantages of the prior known cargo bed extensions by providing a selectively extendable tailgate section of the cargo bed which maintains the structural integrity of the vehicle even upon extension.

The present invention comprises a selectively extendable tailgate section which is telescopically received within a main body of the vehicle cargo bed. The vehicle includes a cargo area with a bottom surface and at least partial side walls extending upwardly from the bottom of the cargo bed. In a preferred embodiment, the cargo area is proximate a passenger area of the vehicle which forms the front of the cargo bed. In the typical utility vehicle, a rear gate or tailgate is provided to enclose the cargo bed on all four sides. The tailgate section includes a hinged gate which facilitates access to the cargo area. Tail lights are incorporated into the corner pillars of the tailgate section and a bumper extends horizontally between the corner pillars beneath the hinged gate.

Unlike conventional tailgates, the rear cargo area of the present invention includes a structurally separate tailgate section which may be telescopically extended from the main body of the cargo area. The tailgate section of the present invention includes side walls which are matingly received within the side walls of the main cargo area and integrally formed with the bumper, hinged gate and corner pillars incorporating the tail lights. A bottom wall of the extendable tailgate section extends from beneath the floor of the main cargo area. Accordingly, the tailgate section can be telescopically extended and retracted relative to the main cargo body maintaining the integrity of the vehicle appearance since the bumper and tail lights travel with the extendable bed.

The extendable tailgate section is slidably supported by a rail and roller assembly incorporated into the side walls of the cargo area. A plurality of rollers are mounted within the fixed side walls of the main cargo area. At least one rail extends interiorly from the tailgate section into the fixed side walls for rolling support by the rollers. Thus, as the side walls of the tailgate section telescopically retract into the side walls of the main cargo bed, the rails will move across the rollers facilitating smooth deployment of the tailgate section.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 4 is an enlarged partial perspective of the extended cargo bed showing the roller support system;

FIG. 5 is a perspective view of the roller support system for the extendable tailgate section.

DETAILED DESCRIPTION OF PREFERRED EMBODIMENT OF THE PRESENT INVENTION

Figure 1:
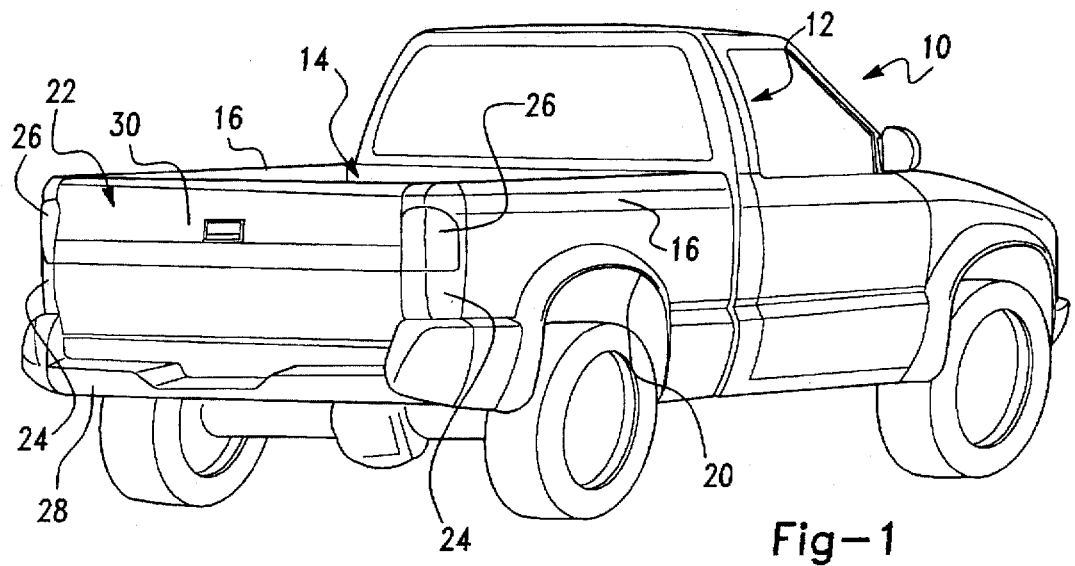
FIG. 1 is a rear perspective view of a utility vehicle having a cargo area embodying the present invention.

Referring first to FIG. 1, there is shown a utility vehicle 10 embodying the present invention and generally including a passenger cab 12 and a rear cargo area 14. It is to be understood that the present invention will be described in connection with a pick-up truck 10 as shown although the invention could be incorporated into various types of utility vehicles having a cargo area. The passenger cab 12 defines the forward end of the cargo area 14 which includes side walls 16 and a bed or bottom surface 18. Rear wheel wells 20 intrude into the side walls 16 and the cargo area 14 limiting the extendibility of the cargo area as will be subsequently described. As with the conventional vehicle 10, the rearward end of the cargo area 14 is defined by a tailgate section 22 including rear corner pillars 24 having the tail lights 26 of the vehicle 10, a rear bumper 28, and a gate or door 30 to facilitate access to the cargo area 14. However, in the present invention the tailgate section 22 is selectively extendable from the cargo area 14 to expand the cargo storage capacity of the vehicle 10.

Figure 2:
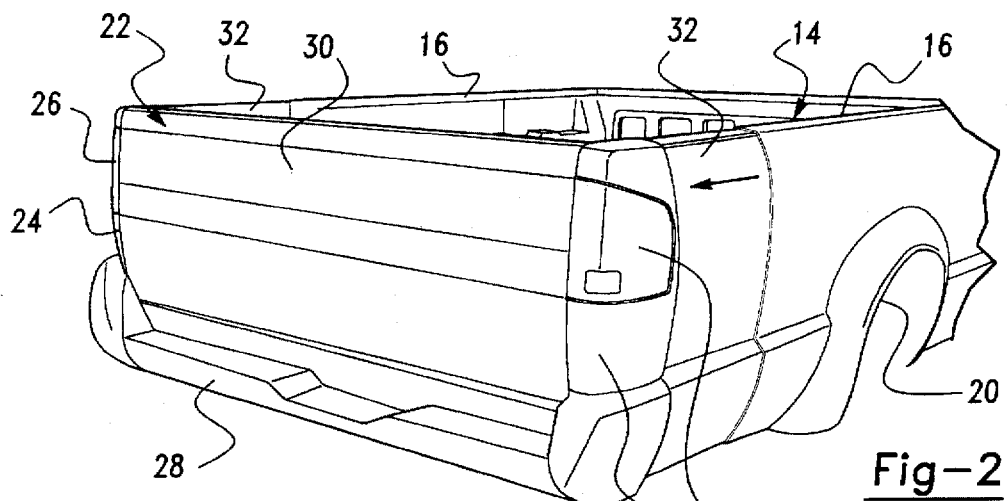
FIG. 2 is a rear perspective of the cargo area with a tailgate section telescopically extended from the main cargo area.
Figure 3:
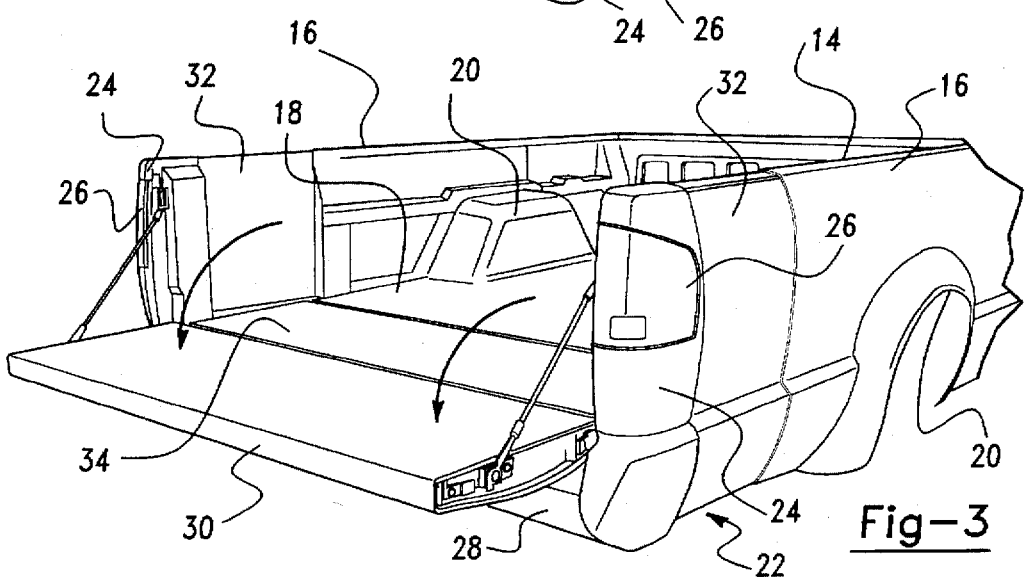
FIG. 3 is a rear perspective of the cargo area with the tailgate section telescopically extended and the rear gate open.

Referring now to FIGS. 1 through 3, the present invention is shown in various stags of deployment to expand the cargo area 14 of the vehicle 10. FIG. 1 shows the tailgate section 22 fully retracted minimizing the cargo capacity of the vehicle 10. FIG. 2 shows the tailgate section 22 extended from the main body of the cargo area 14 expanding the cargo capacity. FIG. 3 shows the tailgate section 22 extended and the tailgate 30 pivoted to the open position exposing the cargo bed 18. As is best shown in FIG. 2, the tailgate section 22 telescopically extends from the main body of the cargo area 14.

The tailgate section 22 includes secondary side walls 32 fixedly attached to the corner pillars 24 and a secondary bed surface 34 extending between the secondary side walls 32. The secondary side walls 32 are matingly received in the fixed side walls 16 of the cargo area 14 as the tailgate section 22 is retracted into the main body of the cargo bed 14. The secondary side walls 32 are sized slightly smaller than the fixed walls 16 in order to facilitate mating retraction. Similarly, the secondary bed surface 34 slides beneath the primary bed 18 of the cargo area 14 as the tailgate section 22 is retracted. As a result, a continuous cargo area 14 is maintained even as the tailgate section 22 is extended from the primary cargo area 14. Furthermore, the structural and aesthetic integrity of the vehicle 10 is maintained whether the tailgate section 22 is retracted or extended since the rear features of the vehicle 10, such as the tail lights 26 and bumper 28 are carried by the selectively extendable tailgate section 22.

Figure 6:
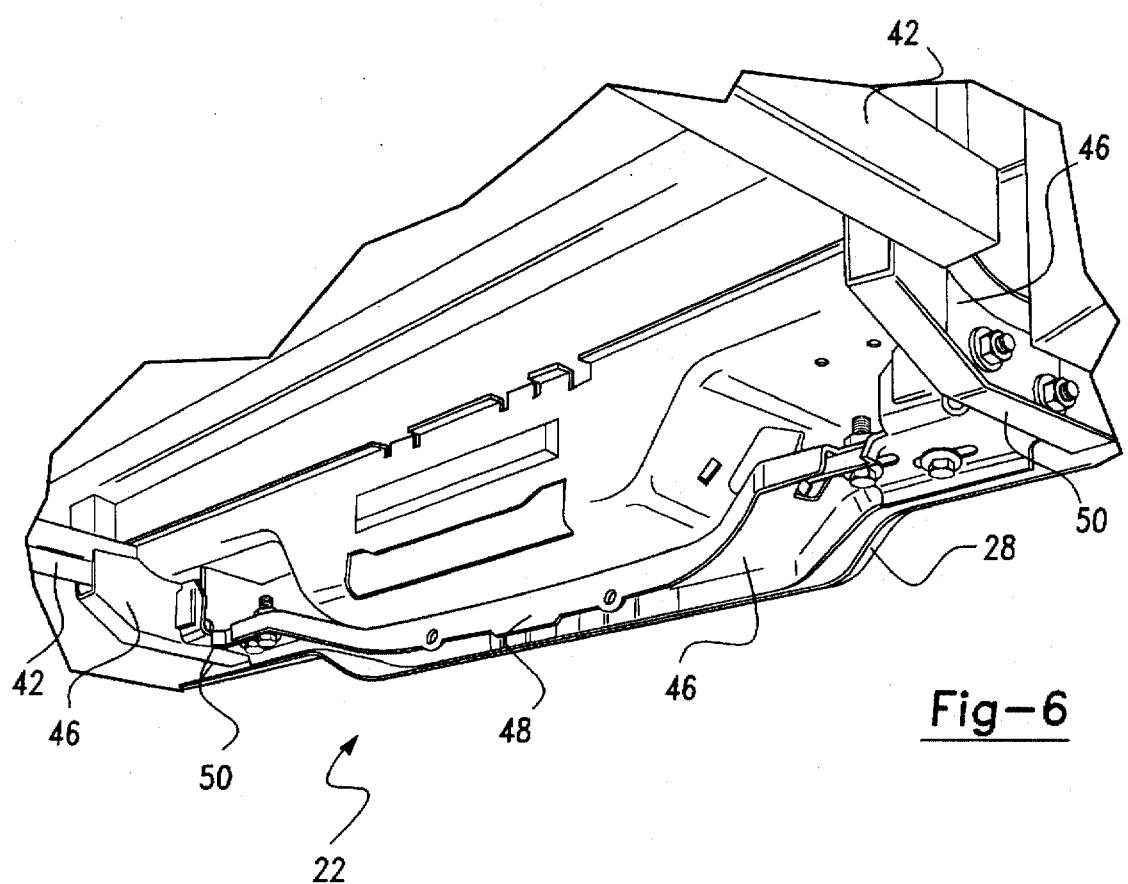
FIG. 6 is a partial undercarriage perspective of the extendable tailgate section.

The tailgate section 22 is slidably supported by a rail and roller assembly 40 as best shown in FIGS. 4 through 6. The assembly 40 cantilevers the tailgate section 22 to keep the tailgate section 22 from pivoting downward particularly in the extended position. Attached to the secondary side walls 32 of the tailgate section 22 are rail members 42. A first end of the rail members 42 is fixedly secured to the tailgate section 22. A pair of rails 42 are contemplated for each side wall 32 to provide upper and lower support for the tailgate section 22. However, any number of rails 42 may be employed depending upon the application. A second end of the rail members 42 is movably supported by a plurality of rollers 44 mounted within the side walls 16. As the tailgate section 22 is retracted, the rails 42 move through the rollers 44 facilitating smooth deployment of the tailgate section. In a preferred embodiment, a rail 42 and roller 44 assembly is provided along an upper edge of the side walls 16 (FIG. 4) and proximate a lower edge of the side walls (FIG. 5).

Referring now to FIG. 6, rail members 42 are fixedly secured to the tailgate section 22. In order to provide added strength and support, reinforcement members 46 are mounted to the tailgate section 22. In a preferred embodiment, the reinforcement members 46 includes a cross member 48 attached to a pair of side supports 50 to which the rails are secured. In addition to strengthening the tailgate section 22, these reinforcement members 46 stabilize the tailgate particularly in the extended position.

Thus, the present invention provides an expandable tailgate section of a vehicle cargo area which maintains the visual structure of the vehicle. In both the extended and retracted position, the tailgate section 22 forms a natural portion of the vehicle 10. The telescoping tailgate section 22 provides a literal stretching of the vehicle 10 expanding the cargo area 14. Despite the adjustment, the tail lights, bumper and gate remain an integral part of the vehicle 10. Yet expansion and retraction are easily transformed because of the rail and roller assemblies incorporated into the vehicle.

The foregoing detailed description has been given for clearness of understanding only and no unnecessary limitations should be understood therefrom as some modifications will be obvious to those skilled in the art without departing from the scope and spirit of the appended claims.

What is claimed is:

1. A vehicle having a cargo area with fixed side walls and a bottom surface, said vehicle comprising:

a tailgate section forming a rear portion of the vehicle cargo area and including rear corner pillars incorporating indicator lights and a deployable gate extending between said corner pillars for selective access to the cargo area, said tailgate section longitudinally movable relative to the fixed side walls and bottom surface between a retracted position and an extended position to expend the cargo area of the vehicle, a rail and roller assembly mounted within each of the fixed side walls of the cargo area for slidably supporting said tailgate section in said retracted and extended positions, said movable tailgate section maintaining the visual integrity of the vehicle in both said retracted and extended positions.

2. The vehicle as defined in claim 1 wherein said tailgate section includes secondary side walls extending longitudinally from said rear corner pillars for telescoping engagement with the fixed side walls and a secondary bottom surface, said secondary side walls and secondary bottom surface of said tailgate section expanding the cargo area of said vehicle upon extension of said tailgate section.

3. The vehicle as defined in claim 1 wherein said secondary bottom surface of said tailgate section extends beneath the bottom surface of the cargo area upon retraction of said tailgate section.

4. The vehicle as defined in claim 1 wherein said rail and roller assembly includes at least one rail member fixedly secured within each of said secondary side walls of said tailgate section and at least one roller set fixedly mounted within each of the side walls of the cargo area, said at least one roller set movably supporting a mating rail member for longitudinal movement of said tailgate section.

5. A vehicle having a passenger area and a cargo area with fixed side walls and a bottom surface, the passenger area formed forwardly of the cargo area, said vehicle comprising:

a tailgate section forming a rear portion of the vehicle cargo area and including rear corner pillars incorporating indicator lights, a deployable gate extending between said corner pillars for selective access to the cargo area, and secondary side walls extending longitudinally from said rear corner pillars, said tailgate section longitudinally movable relative to the fixed side walls and bottom surface between a retracted position and an extended position to expand the cargo area of the vehicle, a rail and roller assembly having at least one rail member fixedly secured within each of said secondary side walls of said tailgate section and at least one roller set fixedly mounted within each of said side walls of the cargo area, said at least one roller set movably supporting a mating rail member for longitudinal movement of said tailgate section, said secondary side walls being telescopically received within the fixed side walls of the cargo area during movement of said tailgate section wherein the visual integrity of the vehicle is maintained as said vehicle section is selectively moved between said retracted and extended positions.

* * * * *